United States Patent [19]

Schubert et al.

[11] Patent Number: 5,249,359
[45] Date of Patent: Oct. 5, 1993

[54] PROCESS FOR MANUFACTURING FINELY STRUCTURED BODIES SUCH AS HEAT EXCHANGERS

[75] Inventors: Klaus Schubert, Karlsruhe; Wilhelm Bier, Eggenstein-Leopoldshafen; Gerd Linder, Karlsruhe; Peter Schmid, Munich; Peter Bichler, Schondorf; Winfried Brunner, Unterhaching; Wolfgang Simon, Munich, all of Fed. Rep. of Germany

[73] Assignees: Kernforschungszentrum Karlsruhe GmbH, Karlsruhe; Messerschmidt-Bölkow-Blohm, Müchen, both of Fed. Rep. of Germany

[21] Appl. No.: 854,065

[22] Filed: Mar. 19, 1992

Related U.S. Application Data

[60] Division of Ser. No. 708,818, May 31, 1991, Pat. No. 5,152,060, which is a continuation of Ser. No. 306,030, Jan. 19, 1988, abandoned.

[30] Foreign Application Priority Data

Mar. 20, 1987 [DE] Fed. Rep. of Germany ....... 3709278

[51] Int. Cl.$^5$ ............................................. B23D 15/00
[52] U.S. Cl. ............... 29/890.039; 29/890.03; 29/428; 29/17.2; 29/178
[58] Field of Search ............ 29/890.039, 890.03, 29/17.1, 17.2, 17.4, 17.8, 428, 557

[56] References Cited

U.S. PATENT DOCUMENTS

| | | |
|---|---|---|
| 1,215,775 | 2/1917 | Campbell . |
| 1,662,870 | 3/1928 | Stancliffe . |
| 4,053,969 | 10/1977 | Bayard ................. 29/157 |
| 4,277,966 | 7/1981 | Rambauske ............ 72/148 |
| 4,620,463 | 11/1986 | Horn et al. ................ 82/1 |
| 4,655,738 | 4/1987 | Jansson ................ 493/269 |
| 4,735,019 | 4/1988 | Wiederkehr ........... 51/166 |
| 4,828,437 | 5/1989 | Mukerjee et al. .......... 409/231 |

FOREIGN PATENT DOCUMENTS

| | | |
|---|---|---|
| 232933 | 8/1920 | Fed. Rep. of Germany . |
| 2279514 | 2/1976 | France . |
| 36149 | 3/1983 | Japan . |
| 209430 | 12/1983 | Japan . |

OTHER PUBLICATIONS

Cross, W. T., et al., "Process Intensification: Laminar Flow Heat Transfer", *Chem. Eng. Res. Des.*, vol. 64, pp. 293-302, Jul. 1986.

*Primary Examiner*—Irene Cuda
*Attorney, Agent, or Firm*—Spencer, Frank & Schneider

[57] ABSTRACT

A method of producing a finely structured body which includes a plurality of stacked, cut sections of foil at least one of which is provided with grooves in a selected groove direction on at least one surface thereof, and which has a plurality of closely juxtaposed, channel-like perforations with high shape accuracy, true dimensions and high surface quality. The method includes: a. providing a vacuum clamping means comprised of a ground, sintered metal plate which is connected to a vacuum source and which is positioned on a work table which is movable in two mutually perpendicular directions X and Y; b. positioning a machinable foil on the ground, sintered metal plate and clamping the machinable foil thereto by applying an effective amount of vacuum; c. cutting a plurality of parallel grooves into the surface of the machinable foil by means of at least one shaping diamond positioned on a cutting spindle and adjustable in a direction Z, each groove of the plurality of grooves having a groove length, a groove width, and a cross-sectional shape that is constant over the groove length and freely selectable; d. cutting the grooved machinable foil into cut sections having selected lengths and widths; and e. stacking the cut sections, wherein the plurality of grooves have a form precision such that, for groove lengths of more than 1000 μm, the groove width has an accuracy of about +1 μm for land widths which equal or exceed about 15 μm.

2 Claims, 4 Drawing Sheets

PROCESS FOR MANUFACTURING FINELY STRUCTURED BODIES SUCH AS HEAT EXCHANGERS

This is a division of Ser. No. 07/708,818, filed May 31, 1991, now U.S. Pat. No. 5,152,060, which is a continuation of Ser. No. 07/306,030, filed Jan. 19, 1988, now abandoned.

BACKGROUND OF THE INVENTION

1. Field of the Invention

The invention relates to a method of manufacturing finely structured bodies, such as heat exchangers, mechanical fine filters or optical gratings having a plurality of closely juxtaposed, channel-like perforations with high shape accuracy, true dimensions and high surface quality, wherein a plurality of grooves having a cross sections that is constant over their length are cut into the surface of machinable, preferably metal, foils and wherein the grooved or grooved and ungrooved foils are stacked on top of one another and are interconnected.

2. Description of the Related Art

For the manufacture of heat exchangers or other bodies having finely, precisely calibrated pores it is known to stack grooved, metal plates on top of one another (see German Patent No. 323,933). Larger grooves can be worked in by means of profiled rollers; finer grooves are applied by means of photoetching. For the latter, grooves of a depth having 0.3 mm and having an average groove width of about 0.68 mm are etched, for example, into copper plates having a thickness of 0.5 mm (Chem. Eng. Res. Des., Vol. 64, July, 1986, pages 295 and 296). However, for some applications, such as, for example, heat pipes or for the realization of very high specific heat transfer surface areas of 15,000 to 20,000 m/m$^3$ per exchange side, much finer structures are required. Also, due to the etching process, the plates have groove walls having a relatively rough surface which increases flow resistance and the danger of deposits.

SUMMARY OF THE INVENTION

It is the object of the present invention to provide a method of manufacturing finely structured bodies of the specified type with which it is possible to produce by simple means a large number of closely adjacent, channel-like perforations having a constant cross-section over their length, high precision and surface quality in these bodies, with the cross-sectional shape and the arrangement of the perforations being freely selectable within wide limits, the accuracy of the cross-sectional shape lying in a range of one thousandth of a millimeter and the smallest wall thickness between adjacent perforations lying in a range of one hundredth of a millimeter and this with perforation lengths of more than 1000 μm.

To solve this problem, the grooves are machined by means of shaping diamonds and, with groove lengths of more than 1000 μm, the accuracy of the shapes of the grooves with respect to the groove width is about ±1 μm for the smallest land widths of aobut 15 μm. Advantageous features of this solution are many. The foil to be provided with grooves may be stretched around the cylindrical mandrel of a lathe so that its abutment edges extending transversely to the direction of the grooves are retained radially an axial recess of the mandrel within the smallest diameter to be worked, such as by a clamping device, and the grooves are worked in by means of a shaping diamond in the form of a turning tool. Alternately, the foil to be provided with grooves may be stretched over the ground, sintered metal plate of a vacuum device and the foil may be worked by means of one or a plurality of shaping diamonds disposed at a cutting or broaching tool. The stacked foils may be connected with one another by diffusion soldering or welding.

With the invention it is possible to highly accurately produce in the finely structured bodies, depending on the cut of the shaping diamond, in addition to circular perforations, also polygonal or crossed-slit perforations down to an edge length of 40 μm. Their smooth surfaces considerably reduce the danger of deposits; the average roughing depth of the surface being normally less than 0.05 μm.

The thus-obtained finely structured bodies, with an optical transparency of more than 50%, have a specific surface area of about 20,000 to 40,000 m/m$^3$, with the depth of the bodies being practically determinable at will. Thus, a plurality of possible uses exist; already mentioned were heat exchangers for liquids and gases. This also includes so-called heat pipes for cooling or heating of micro-structure components.

Further fields of use include mechanical fine filters and also optical gratings, for example, X-ray light storage foils.

The now-possible manufacture of accurately defined cross-sectional shapes in the μm range opens up new applications in the production of filaments, wires, etc. A concrete example of this is spinning nozzle plates. Due to their large specific surface area, structures produced according to the invention are also suitable as catalyst carriers or as substrate surfaces for microorganisms.

BRIEF DESCRIPTION OF THE DRAWINGS

Embodiments of the ivnention will now be described with reference to the drawings.

DESCRIPTION OF THE PREFERRED EMBODIMENTS

Figure 1:
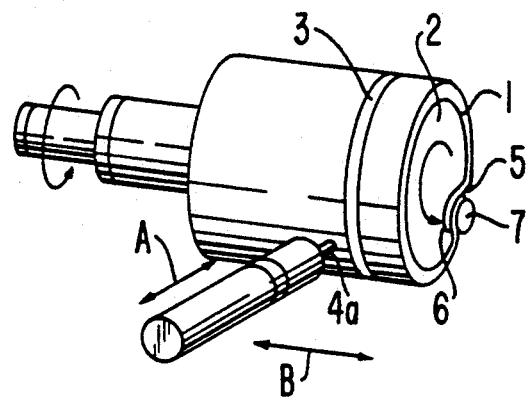
FIG. 1 shows a foil stretched over the mandrel of a lathe during working.

According to FIG. 1 a metal foil is stretched around a mandrel 2 of a lathe so that successive grooves 3 can be cut by means of a shaping diamond 4a which is advanced by means of a finely adjustable feed as shown by arrows A, B. Foil 1 is connected with itself in an overlapping manner at its opposing edges abutment edges 5, e.g., by welding, with the region of the weld being pressed into a recess 6 of mandrel 2 of the lathe by means of a clamping device 7, with this clamping device 7 also lying within this recess 6.

Figure 2:
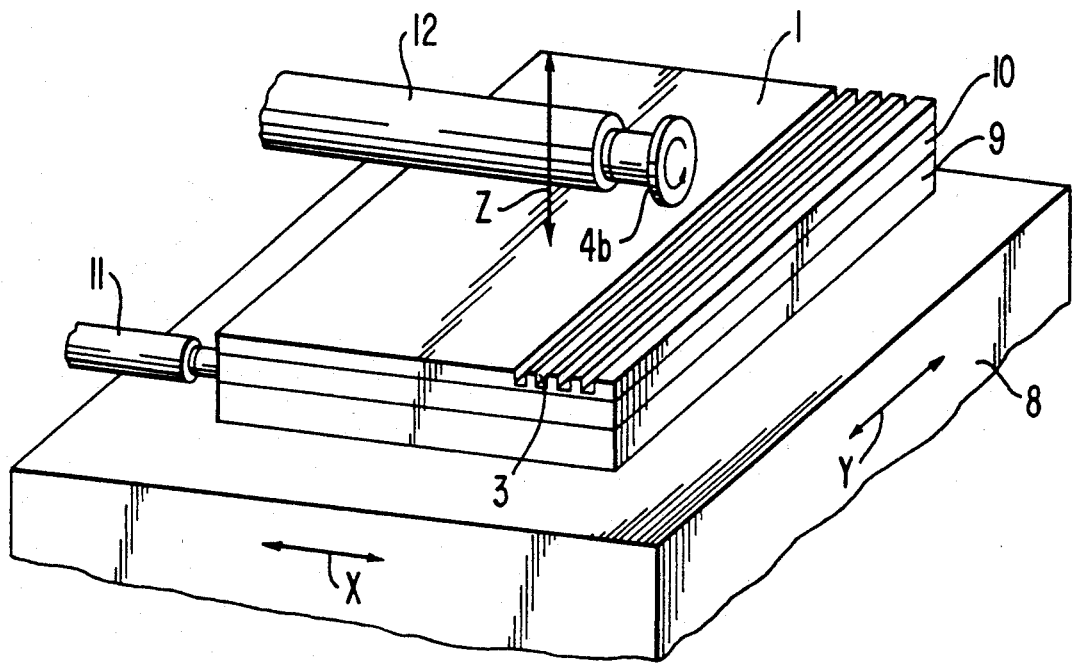
FIG. 2 shows a foil stretched over an X-Y table during working.
Figure 3:
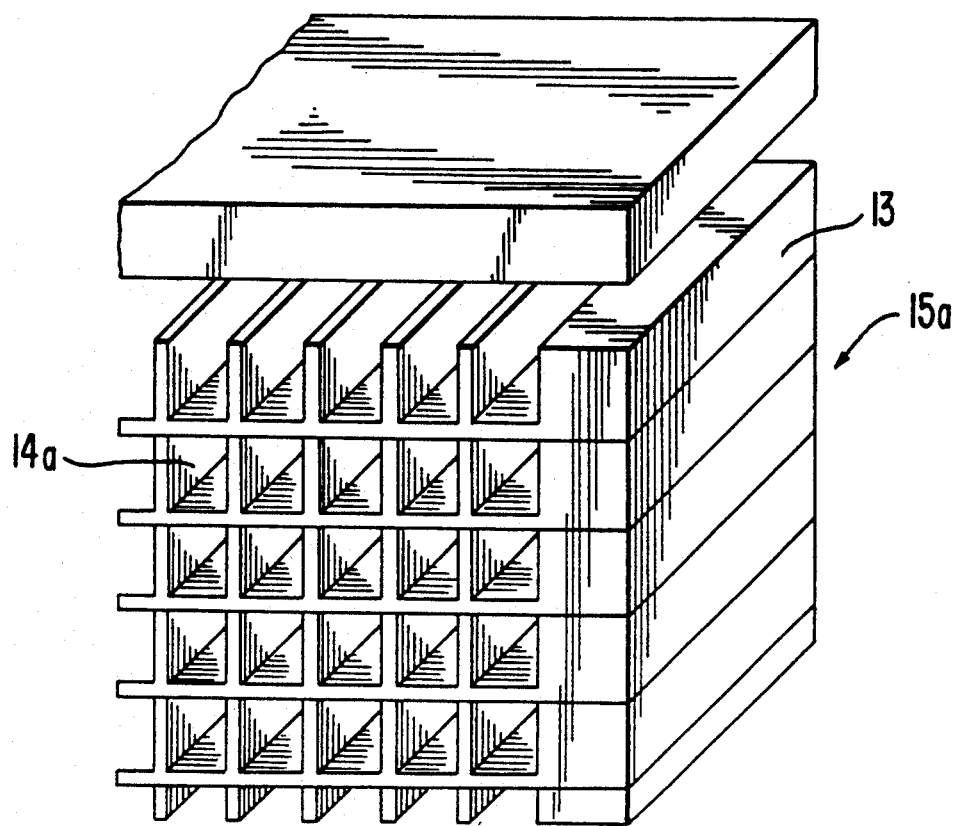
FIG. 3 shows a finely structured body composed of stacked foils and provided with rectangular perforations.

According to FIG. 2, foil 1 is stretched over a work table 8 by means of a vacuum clamping device 9 composed of a ground, sintered metal plate 10 which is connected to a vacuum conduit 11. Work table 8 can be moved in two mutually perpendicular directions (X,Y) with respect to a shaping diamond 4b fixed on a cutting spindle 12, the diamond being adjustable in the Z direction. Instead of the, horizontal cutting arrangement shown in FIG. 2 which includes cutting spindle 12, the shaping diamond or diamonds 4b may also be disposed at a broaching tool. The kinematic association of tool and workpiece is also only exemplary, the cutting or broaching tool may also be displaceable in the X and/or Y direction, or the work table 8 could be movable in the Z direction After grooves 3 have been worked in, foil 1 is cut into preferably rectangular sections 13 of the desired length and width. According to FIG. 3, these sections 13 are stacked to form the desired finely structured body 15a in which perforations 14a are composed, in an exemplary manner, of rectangular channels having an edge length down to 20 $\mu$m and a wall thickness of about 15 $\mu$m. Thus, it is possible to realize more than 10,000 channels per cm$^2$ of cross-sectional area.

Figure 4:
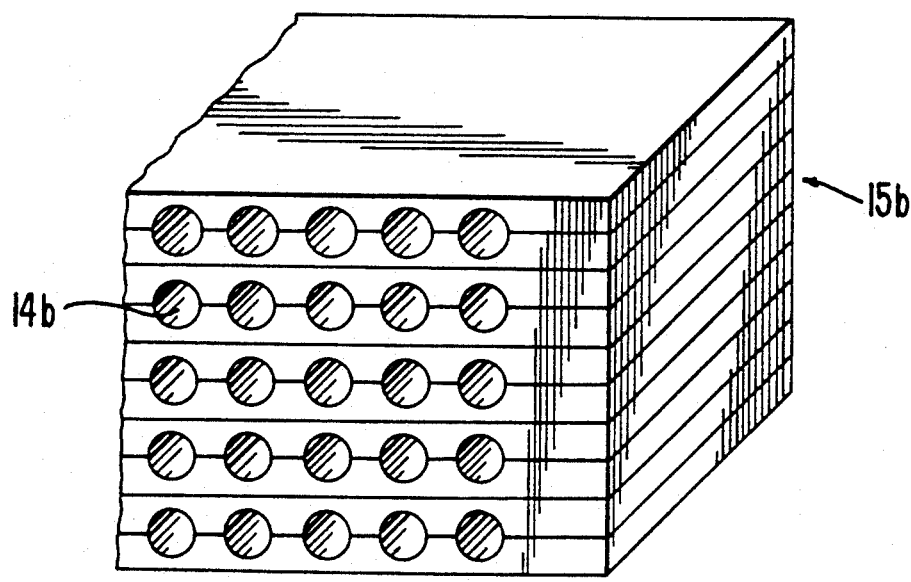
FIG. 4 shows a finely structured body composed of stacked foils and provided with circular perforations.
Figure 5:
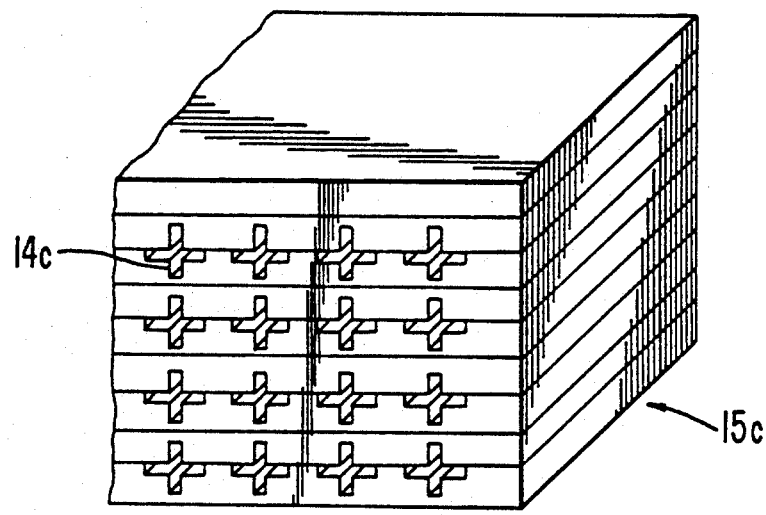
FIG. 5 shows a finely structured body having crossed-slit perforations.

According to FIG. 4, it is also possible to make perforations 14b round in that foils equipped with semicircular grooves are stacked as in mirror images. According to FIG. 5, perforations 14c are given a crossed-slit structure in that some of the foils are worked in succession with two rectangular shaping diamonds (a broad one and a narrow one); then, these foils are combined in mirror image with foils worked only once.

Figure 6A:
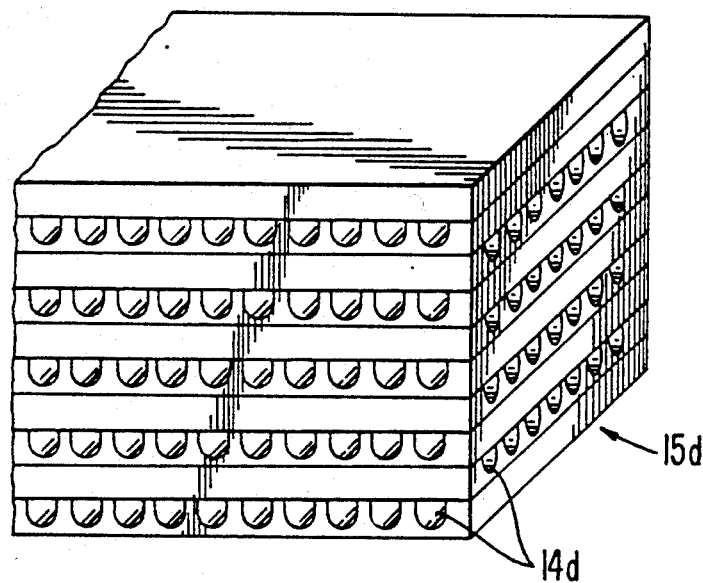
FIGS. 6a to 6b show a finely structured body serving as a cross-current heat exchanger.
Figure 6B:
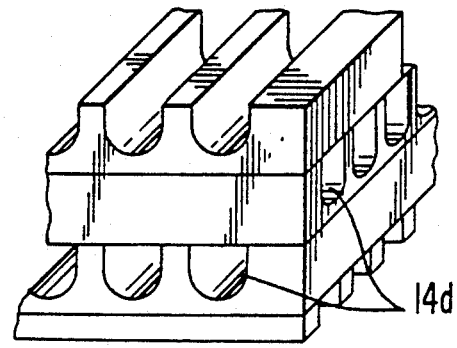

If one stacks foils 1 with respect to their groove orientation so that they alternate in a 90° offset, a finely structured body 15d according to FIG. 6a results which can be used as a cross-current heat exchanger. FIG. 6b is a sectional view to an enlarged scale of this finely structured body.

Figure 7:
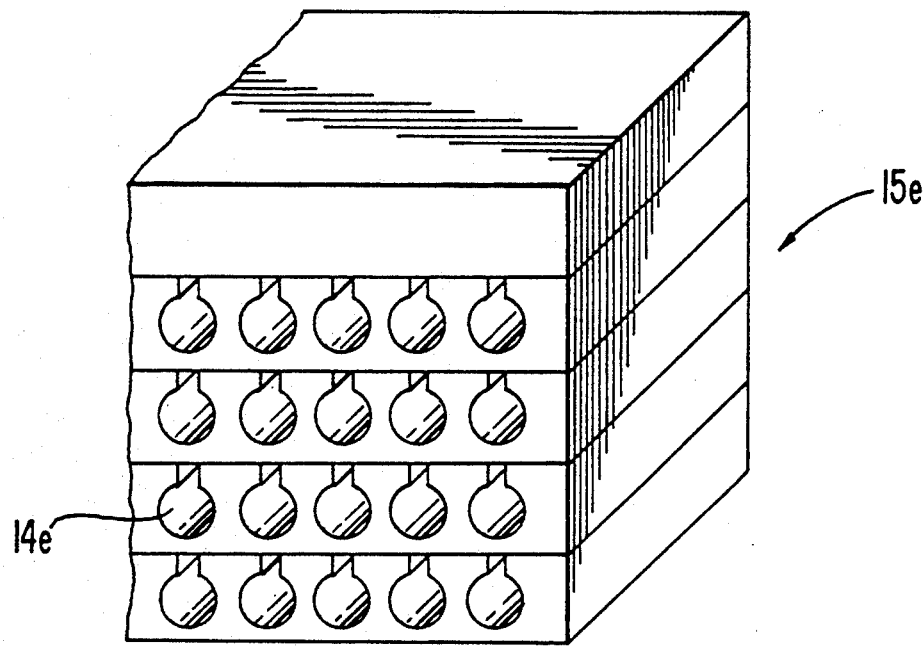
FIG. 7 shows a finely structured body having perforations of a "pear-shaped" cross-section.

If one works the foils 1 by means of a shaping diamond attached to a broaching tool in that initially a rectangular groove is worked and then the lower portion of the groove walls is worked with, for example, a semicircular shaping diamond, the finely structured body 15e according to FIG. 7 results which has "pear-shaped" cross-sections. This body shows clearly that the cross-sectional shape of the channels and channel walls can be freely selected within wide limits undercuts being possible, as well as grooved, cross-sections in which one or both groove walls or parts of the walls are concave or convex.

The stacked foils 1 may be held together in a known manner between cover plates. Additionally it is possible to connect the stacked foils 1 with one another by means of gluing, soldering or welding, preferably diffusion soldering or welding. In addition to the illustrated cross-sectional shapes, others, for example, trapezoidal or hexagonal cross-sections can of course also be realized. Instead, of metal foils, foils of other machinable materials, i.e. machinable foils, can also be employed, such as, for example, plastics or semiconductors.

What is claimed is:

1. A method of producing a finely structured body which is useful as a heat exchanger, a mechanical fine filter or an optical grating, which is comprised of a plurality of stacked, cut sections of foil at least one of which is provided with grooves in a selected groove direction on at least one surface thereof, and which has a plurality of closely juxtaposed, channel-like perforations with high shape accuracy, true dimensions and high surface quality, the method comprising:
   a. providing a vacuum clamping means comprised of a ground, sintered metal plate which is connected to a vacuum source and which is positioned on a work table which is movable in two mutually perpendicular directions X and Y;
   b. positioning a machinable foil on the ground, sintered metal plate and clamping the machinable foil thereto by applying an effective amount of vacuum;
   c. cutting a plurality of parallel grooves into the surface of the machinable foil by means of at least one shaping diamond positioned on a cutting spindle and adjustable in a direction Z, each groove of the plurality of grooves having a groove length, a groove width, and a cross-sectional shape that is constant over the groove length and freely selectable;
   d. cutting the grooved machinable foil into cut sections having selected lengths and widths; and
   e. stacking the cut sections,
   wherein the plurality of grooves have a form precision such that, for groove length of more than 1000 $\mu$m, the groove width has an accuracy of about +1 $\mu$m for land widths which euqal or exceed about 15 $\mu$m.

2. The method according to claim 1, wherein the stacked foils are connected to one another by one of diffusion soldering or welding.

* * * * *